(No Model.)
J. R. JONES.
FRUIT PICKER.
No. 510,917. Patented Dec. 19, 1893.
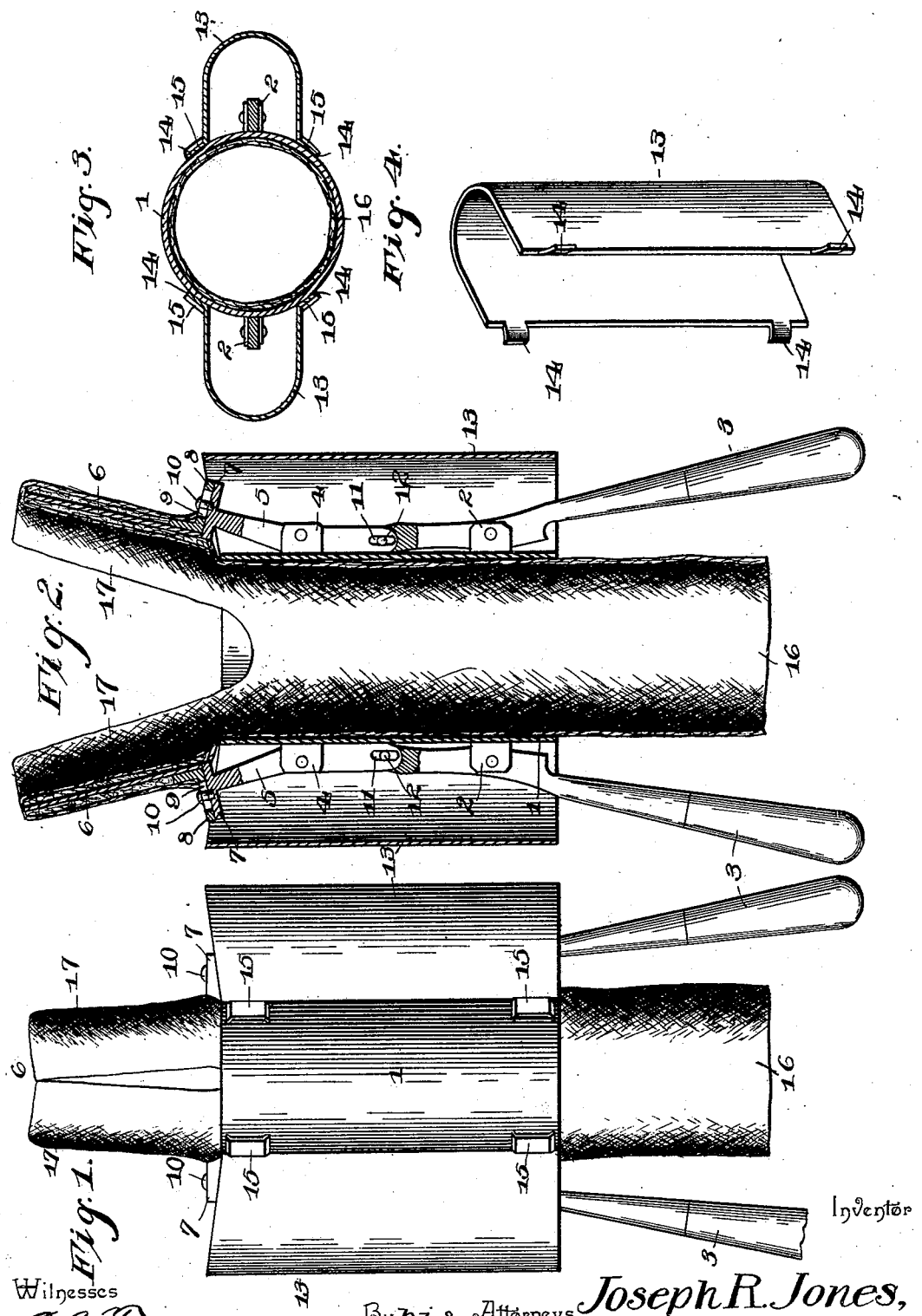
Witnesses
C. A. Ford.
By his Attorneys.
Joseph R. Jones,
C. A. Snow & Co.
Inventor

UNITED STATES PATENT OFFICE.

JOSEPH R. JONES, OF WEST CORNWALL, ASSIGNOR OF TWO-THIRDS TO ALLAN CALHOUN, OF MIDDLEBURY, AND CHARLES R. WITHERELL, OF CORNWALL, VERMONT.

FRUIT-PICKER.

SPECIFICATION forming part of Letters Patent No. 510,917, dated December 19, 1893.

Application filed May 24, 1893. Serial No. 475,333. (No model.)

*To all whom it may concern:*

Be it known that I, JOSEPH R. JONES, a citizen of the United States, residing at West Cornwall, in the county of Addison and State of Vermont, have invented a new and useful Fruit-Picker, of which the following is a specification.

My invention relates to improvements in fruit pickers, and has for its object to provide a simple, inexpensive and efficient device, by which fruit may be detached from the tree and conveyed without injury thereto to a basket or other container standing upon the ground.

Further objects and advantages of my invention will appear in the following description, and the novel features thereof will be particularly pointed out in the appended claims.

In the drawings: Figure 1 is a side view of a fruit picker embodying my invention. Fig. 2 is a vertical central sectional view of the same. Fig. 3 is a horizontal section thereof. Fig. 4 is a detail view of one of the guards, detached.

Similar numerals of reference indicate corresponding parts in all the figures of the drawings.

1 designates a cylindrical body-portion or mouth, which forms a frame or support for the co-operating parts of the device, and is provided at diametrically opposite sides with ears, 2, to which are pivoted the operating handles, 3. Respectively above the ears, 2, are similar ears, 4, to which are pivoted rocking levers, 5, bearing the jaws, 6. The levers 5, are provided at their upper ends with guides, 7, in which are fitted the horizontal tangs, 8, at the lower ends of the jaws, 6. Said tangs are slotted longitudinally, as shown at 9, to receive the adjusting screws, 10. By these adjusting means the interval between the jaws may be regulated to suit the average size of the fruit which is to be picked. The lower end of each rocking-lever is provided with a longitudinal slot, 11, in which fits a transverse pivot pin, 12, in the bifurcated end of the respective handle. The rocking levers and the handles are bowed inwardly or toward the cylindrical body portion from their extremities to their pivotal points, to give said parts additional space for vibration without arranging their pivotal points remote from the walls of the body. Furthermore, the upper arms of the rocking levers are bevel or tapered, to enable the jaws to swing inwardly beyond perpendicular positions, whereby, as they near the inward limits of their movement they are drawn downwardly.

Removable guards, 13, substantially semi-cylindrical in cross-section, and equal in length to the cylindrical body portion, are provided to inclose and protect the connected ends of the handles and rocking levers, and prevent the boughs of the trees from interfering with or locking them against movement. These guards are provided at their free edges with projecting tongues, 14, to engage keepers, 15, which are carried by the cylindrical body-portion of the device. The flexible chute or pocket, 16, extends vertically through the mouth of the picker, and is provided at its upper end with extensions, 17—17, which inclose and conceal the jaws, whereby the fruit may be detached from the tree without bruising or otherwise injuring it. The cylindrical mouth prevents the entanglement of the chute or pocket with the limbs of the tree.

Having thus described my invention, what I claim, and desire to secure by Letters Patent of the United States, is—

1. In a fruit picker, the combination of an inflexible cylindrical mouth or body-portion, jaw-bearing arms pivotally connected to opposite sides of the mouth or body-portion with the jaws arranged above and adjacent to and adapted to close over the center of the upper end thereof, a flexible chute or pocket extending through the mouth or body-portion and provided with extensions inclosing the jaws, and operating handles operatively connected to the jaw-bearing arms, substantially as specified.

2. In a fruit picker, the combination with a cylindrical mouth or body-portion, of rocking-arms fulcrumed at opposite sides of the same, jaws adjustably connected to the upper ends of said arms and extending inwardly over the mouth or body-portion, handles connected, operatively, to the rocking arms, and a chute or pocket disposed in the mouth or body-portion and connected to and supported by the jaws, substantially as specified.

3. In a fruit picker, the combination with a cylindrical mouth or body-portion, of opposite rocking-arms fulcrumed upon the mouth or body-portion and provided at their upper ends with transverse guides, jaws provided with slotted tangs fitted in said guides, set screws engaging the slots in the tangs to lock the jaws at the desired adjustment, handles pivotally connected, by sliding or slotted joints, with the lower ends of the rocking-arms, and a chute or pocket carried by the jaws and extending through the mouth or body-portion, substantially as specified.

4. In a fruit picker, the combination with a mouth or body-portion, diametrically opposite rocking arms, fulcrumed to the mouth or body-portion and bearing jaws, a chute, and handles operatively connected to the rocking arms, of detachable guards fixed to the sides of the mouth or body-portion and inclosing the operating parts, substantially as specified.

In testimony that I claim the foregoing as my own I have hereto affixed my signature in the presence of two witnesses.

JOSEPH R. JONES.

Witnesses:
LEWIS RUSSELL,
JOHN W. WITHERELL.